June 7, 1938.  E. R. FAUSSET  2,120,024
MANUFACTURE OF FLARED FRUSTUMS
Filed Dec. 9, 1935  4 Sheets-Sheet 1

INVENTOR
Ernest R. Fausset
BY
Spencer Hardman & Fehr
his ATTORNEYs

June 7, 1938.  E. R. FAUSSET  2,120,024
MANUFACTURE OF FLARED FRUSTUMS
Filed Dec. 9, 1935  4 Sheets-Sheet 2

INVENTOR
Ernest R. Fausset
BY Spencer Hardman & Fehr
his ATTORNEYS

June 7, 1938.   E. R. FAUSSET   2,120,024
MANUFACTURE OF FLARED FRUSTUMS
Filed Dec. 9, 1935   4 Sheets-Sheet 3
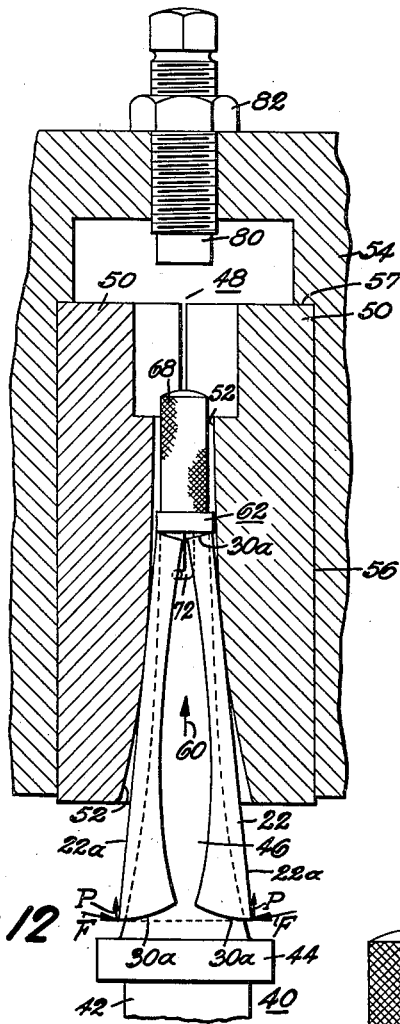

June 7, 1938.         E. R. FAUSSET         2,120,024
MANUFACTURE OF FLARED FRUSTUMS
Filed Dec. 9, 1935                 4 Sheets-Sheet 4

INVENTOR
Ernest R. Fausset
BY
Spencer Hardman & Fehr
his ATTORNEYS

Patented June 7, 1938

2,120,024

UNITED STATES PATENT OFFICE 2,120,024

MANUFACTURE OF FLARED FRUSTUMS

Ernest R. Fausset, Anderson, Ind., assignor to General Motors Corporation, Detroit, Mich., a corporation of Delaware Application December 9, 1935, Serial No. 53,482

2 Claims. (Cl. 29—169.5)

This invention relates to sheet metal working and more particularly to sheet metal articles of flared frustum-shape such as sound projectors, and to a method of making such articles.

Articles of this type have heretofore been made by expanding cylindrical or conical tubes until they assume the desired flare. However, this procedure is unsatisfactory for several reasons. Expansion of a seamless tube unduly weakens the material and leaves an inherent stress in the article, either one of which defects may render the article inapplicable for the purpose intended. Frequently, the cylindrical or conical tubes are made from sheet stock and their meeting edges joined by welding, brazing, riveting or the like, before they are expanded. In that case, the expansion furthermore weakens, or even destroys, the joint between the meeting edges of a tube. Moreover, the defects and inherent stresses in the article which are caused by the expansion mostly escape detection by the ordinary methods of inspection. In conclusion, most articles thus expanded are afflicted with more or less serious defects and oftentimes pass inspection when they actually should be rejected.

It is an object of the present invention to eliminate the above defects in sheet metal articles of flared frustum-shape.

It is another object of the present invention to devise a method of manufacturing these articles free of the above defects.

These objects are accomplished by making the article from a single piece or blank of sheet metal which is fashioned into the desired flared frustum-shape prior to the joining of the meeting edges thereof, thus eliminating those defects in the article which are caused by expansion of a seamed tube. Moreover, bending of the metal is mainly relied on for fashioning the blank into the flared frustum-shape, thus eliminating those inherent stresses and defects in the article which are caused by expansion of a seamless tube.

Further objects and advantages of the present invention will be apparent from the following description, reference being had to the accompanying drawings wherein a preferred embodiment of the present invention is clearly shown.

In the drawings:

Figs. 1 to 5, inclusive, illustrate progressive steps in a novel method of making the described articles.

Fig. 11 is an enlarged fragmentary section taken on the line 11—11 of Fig. 9.

Figs. 12 and 13 are longitudinal sections of the spinning dies with the loaded hand tool in different positions of operation.

Fig. 14 is a fragmentary cross-section of the spinning dies as taken on the line 14—14 of Fig. 13.

Figure 15:
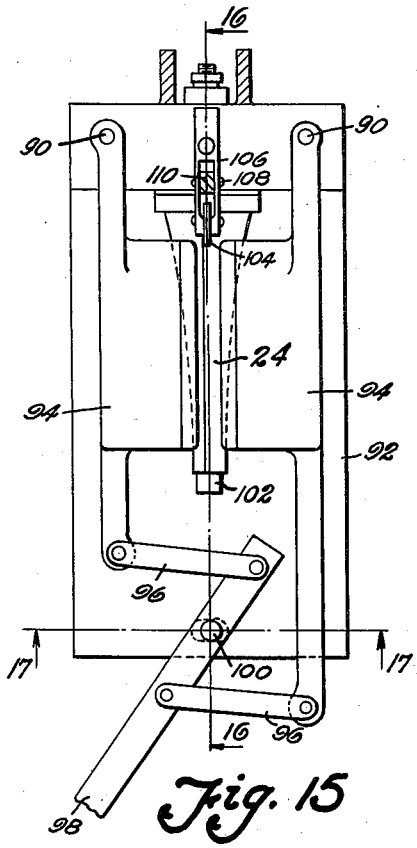

Fig. 15 diagrammatically illustrates an electric welding device used in the pursuance of the novel method.

Figure 16:
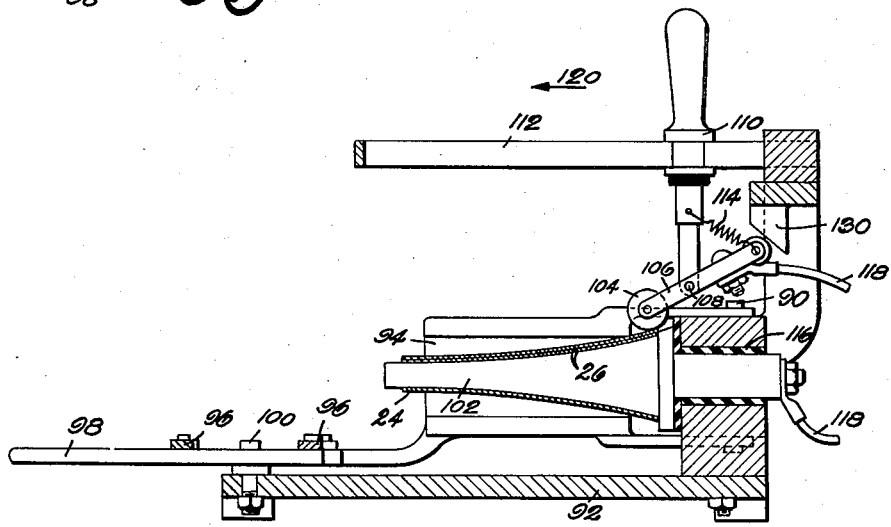

Fig. 16 is a longitudinal section of the welding device as taken on the line 16—16 of Fig. 15.

Figure 17:
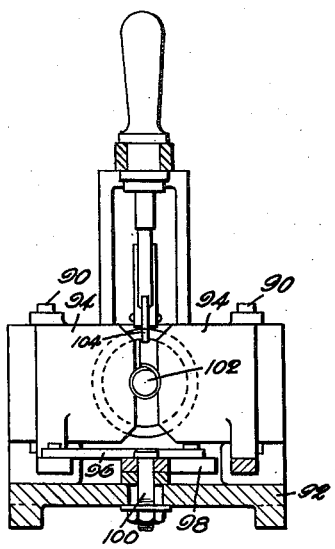

Fig. 17 is a section taken on the line 17—17 of Fig. 15.

Figure 1:
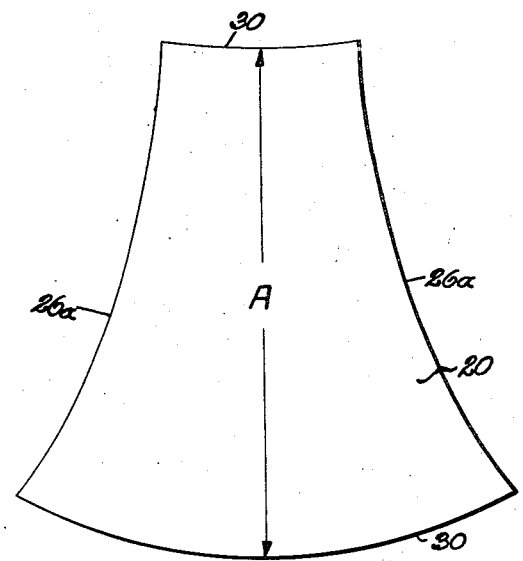
Figure 4:
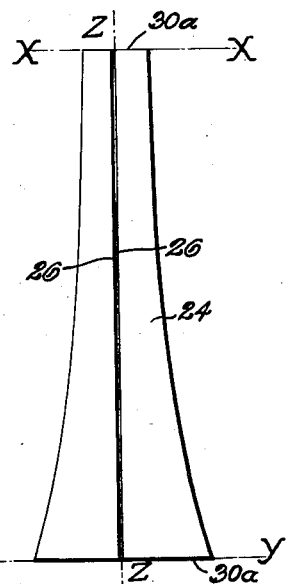
Figure 5:
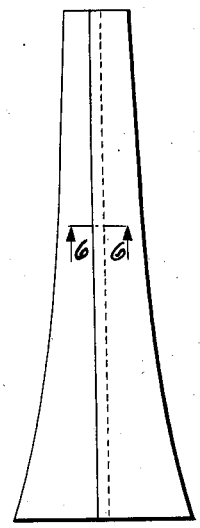
Figure 6:
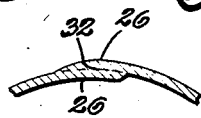
Fig. 6 is an enlarged fragmentary section taken on the line 6—6 of Fig. 5.
Figure 7:
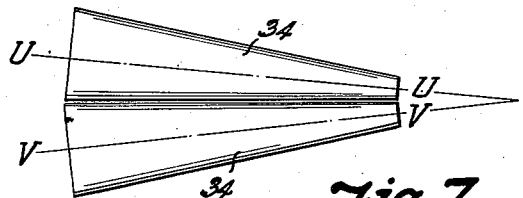
Fig. 7 is a diagrammatic illustration of a pair of form rolls for rolling the blank of Fig. 1 into the open cone of Fig. 2.
Figure 8:
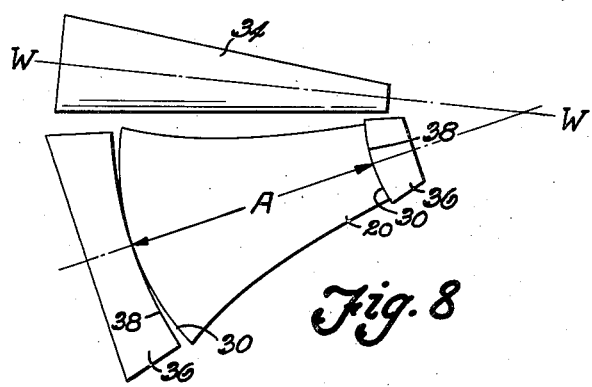
Fig. 8 is a plan view of a device which incorporates the rolls in Fig. 7.

Referring to the drawings the reference numeral 20 designates a blank which is obtained from sheet metal stock by punching or otherwise. This blank is first rolled or bent into the open cone 22 and then spun into the flared, hollow frustum 24, hereafter called the projector. It appears from Fig. 4 that the adjacent edges 26 of the projector are parallel and slightly spaced from each other. This requires that the side edges 26a of the blank be curved in the manner illustrated in Fig. 1. This curve may be exponable, depending on the desired exponential profile of the projector, or can be obtained by actual experiment. The end edges 30 of the blank are so shaped that, when the blank is formed as shown in Fig. 4, said end edges 30a of the formed piece will lie in planes X—X and Y—Y which are parallel to each other and perpendicular to the projector axis ZZ. The adjacent projector edges 26 are finally forced into overlapping engagement and lap-welded, preferably by electric resistance welding. Such welding fuses the overlapping edges 26 substantially thruout a region indicated 32 in Fig. 6.

Figure 2:
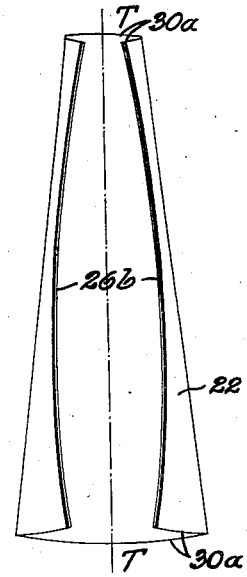
Figure 3:
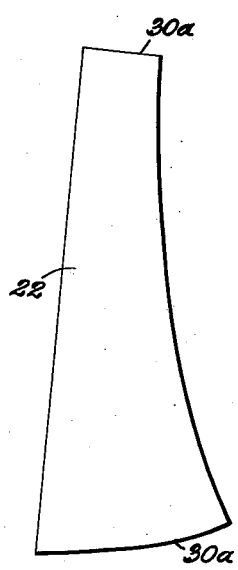
Figure 9:
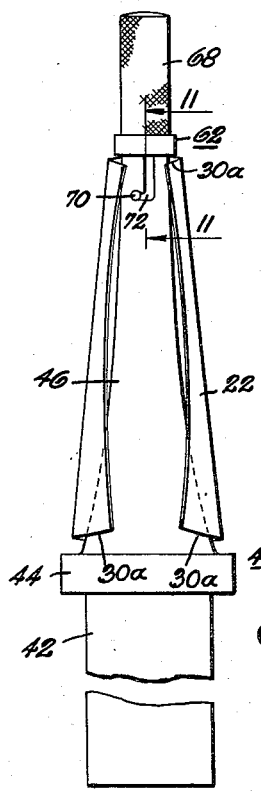
Fig. 9 illustrates a hand tool used in conjunction with another device for spinning the open cone of Figs. 2 and 3 into the flared frustum-shape in Fig. 4.
Figure 10:
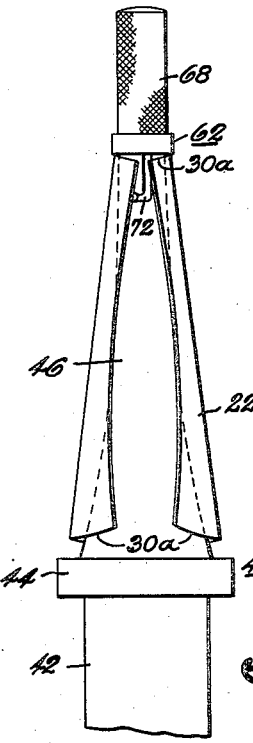
Fig. 10 is a view similar to Fig. 9, showing, however, the narrow end of the cone squeezed inwardly.

Blank 20 is rolled into the open cone 22 by two frustro-conical rollers 34 which are suitably driven in opposite directions and at the same angular speed. One of the rollers 34 is somewhat smaller in cross-section than the other roller, whereby the blank 20 rolls around the smaller roller without the aid of a third roller. Located near these rollers 34 is a guide which provides two ribs 36, the guiding surfaces 38 of which are spaced apart substantially the longitudinal extent A of blank 20. At least one of the guiding surfaces 38 is of the same curvature as one of the end edges 30 of the blank. More particularly, the center of curvature of this circular guide surface 38 lies in the plane WW which passes thru both axes UU and VV of the rollers 34, whereby the blank is so guided into these rollers that the open cone 22 is symmetrical with respect to a plane TT, passing centrally between the spaced side edges 26b and through the cone axis as illustrated in Fig. 2. The open cone 22 is then deposited on a spinning arbor 40 which includes a conventional handle 42, a shoulder 44 and an arbor portion 46. This arbor has the same exponential profile as the projector in Fig. 4. Cooperating with this spinning arbor is a spinning die 48 which in the present instance consists of two halves 50, having complementary cavities 52 which form a die cavity of the same size and shape as the projector 24 in Fig. 4. The die halves 50 are located in a rotary head 54, preferably in a rectangular recess 56 thereof so as to be rotated together with the head. Suitable means such as removable retainer plates (not shown) retain die 48 in engagement with a shoulder 57 of the head 54. The spinning arbor 46 with an open cone 22 thereon (see Fig. 12) is then gradually advanced into the die cavity whereby the cavity walls 52 of the rotating die spin the open cone 22 against the arbor 46. Shortly after engagement of the cone 22 with the rotating cavity walls 52, the ends 30a of the cone are first forced into engagement with the arbor 46. Thereafter, continued advancement of the arbor and cone into the die cavity results in the exertion of forces F by the larger end 30a of the cone against the arbor 46 substantially at right angles to the linear mantle lines or lateral edges 22a of the cone. Since the arbor portion adjacent the larger end 30a of the cone is the most flaring, it is obvious that the forces F have component forces P which tend to advance the cone on the arbor in the direction of arrow 60 in Fig. 12 while the cone is in frictional engagement with the rotating die 48. Such shifting or travel of the cone 22 on the spinning arbor takes place in spite of the counteracting sliding friction between said cone and the die walls 52. This tendency of the cone to travel on the arbor under the inducement of the forces P is greatest at the beginning of a spinning operation and gradually diminishes as the cone is forced toward the arbor as can be readily understood. To prevent such shifting of the cone 22 on the arbor during a spinning operation, the latter is provided with a stop 62. As more particularly shown in Fig. 11, the arbor 46 is recessed at 64 and receives a shank 66 of stop 62 which is also provided with a knurled handle 68. Projecting from this shank 66 is a pin 70 which operates in a bayonet slot 72 of the spinning arbor. Shank 66 is normally engaged by a spring urged plunger 74, motion of which in either direction is restricted by a stop screw 76. In order to permit for passage of the stop 62 through the narrowest portion of the die cavity, the diameter of the stop 62 is not appreciably to exceed the outside diameter of the smaller end 30a of the projector in Figs. 4 and 13. As shown in Fig. 9, a cone 22 may be deposited on the spinning arbor and two opposite end portions of the cone may then be squeezed by hand into alignment with stop 62 (see Fig. 10). Or two opposite portions of the smaller end of the cone may be squeezed closer together prior to deposition on the spinning arbor so that, on deposition, the squeezed end portions of the cone yield over stop 62 and snap into stopping alignment therewith. During the spinning operation, the cone 22 is yieldingly urged against the stop 62 but does not travel on the arbor 46.

In analyzing the spinning operation, it appears that the rotating cavity walls 52 and the nonrotating spinning arbor 46 with the cavity-wall engaging cone 22 thereon, cooperate to produce a sliding friction between said cavity walls and the outer circumference of the cone. A certain amount of this friction is merely transformed into heat energy, absorbed by the cone and the engaging cavity walls, without causing the cone material to budge appreciably. However, every increase of the pressure on the cone 22 beyond a certain limit, as caused by a further advance of the arbor and cone into the die cavity, forces the cone material toward the arbor until the pressure has again decreased to said certain limit. Thus, by gradually advancing the arbor and cone thereon into the die cavity, the sliding friction is repeatedly increased by such small increments that it is practically constant and the pressure forces the cone material toward the arbor at a substantially uniform rate. It appears also from Fig. 12, that the sliding friction first develops on a comparatively small circumferential portion of the cone 22 near the least flared arbor portion, and then spreads gradually toward the more flared portions of the arbor 46 as the cone is advanced into the die cavity.

Experience has taught that after the projector has been completely spun, i. e. when the cavity walls 52 as well as the arbor 46 are in uniform engagement with the projector wall, the slightest additional advance of the arbor into the die cavity causes the projector wall to become wrinkled. This is undoubtedly due to an increase of the sliding friction to such an extent that portions of the cavity walls and of the projector wall stick to each other, whereas other portions of the projector wall stick to the nonrotating arbor. To prevent such an occurrence, the rotating die carrier 54 is provided with an adjustable stop 80 in the form of a screw. A lock nut 82 secures stop 80 in adjusted position. This stop is so adjusted that upon engagement of the handle 68 of stop 62 with said stop screw 80, the arbor 46 has been sufficiently advanced into the die cavity to complete a spinning operation, and any additional advance would result in a wrinkled projector wall. The spinning die 48 may of course be replaced by a die having a cavity of different shape and/or size, in which case a different spinning arbor would have to be used also. For this reason, the arbor 46 with the shoulder 44 is preferably detachably secured to the handle 42 so that a different arbor may be used with one and the same handle. After the conclusion of the spinning operation, the arbor with the projector thereon is withdrawn from the die cavity and the handle 68 is given a slight twist so as to release pin 70 from the bayonet slot 72, whereupon stop 62 may be removed from the arbor and thus permit removal of the projector.

The final step in the instant method consists in overlapping the adjacent projector edges 26 and joining the same in any suitable manner, preferably by electric welding. Reference is now had to Figs. 15 to 17, inclusive, which disclose diagrammatically an electric welding apparatus suitable for this purpose. Pivotally mounted at 90 to a base 92 of any suitable design are two clamps 94, the free ends of which are connected by identical links 96 to a hand lever 98, which is also floatingly pivotally mounted at 100 to the base 92 so that manipulation of said hand lever results in a simultaneous rocking of both clamps 94 in opposite directions. The two opposite faces of the clamps 94 are longitudinally recessed and conform in size and shape to the outside of the projector 24 when the side edges 26 thereof are in overlapping engagement. Also mounted on base 92 is an arbor 102 which is intermediate the recessed clamps 94 and accurately conforms in shape and size to the inside of the projector after the edges 26 thereof have been overlapped. This arbor 102 in conjunction with the clamps 94, though primarily adapted to hold the side edges 26 of the projector in overlapping engagement for welding, performs the equally important function of sizing the final product, because the clamps force all portions of the projector wall uniformly into engagement with the accurately sized and shaped welding arbor 102 irrespective of slight variations in shape of the spun projectors due to different hardness of the projector material. The welding arbor 102 is therefore rightfully a sizing arbor also. A suitable roller electrode 104 may be carried by an arm 106, pivoted at 108 to a handle 110 which may be suitably guided parallel to the axis of the welding arbor 102 by a suitable guide 112. A sufficiently strong tension spring 114 may normally rock arm 106 so as permanently to urge the roller electrode against the welding arbor which is preferably insulatingly mounted in suitable insulation 116 as best shown in Fig. 16. Suitable leads 118 may connect the roller electrode 104 and the welding arbor 102 with any source of electric power, best suited for this type of welding. The handle 110 is insulated from the roller electrode 104 for protection of the operator. In using this device, the operator slides a spun projector 24 over the welding arbor 102, thereby merely observing that the side edges 26 of the projector are so positioned relative to the roller electrode that they are in alignment with the electrode when in overlapping engagement with each other. By manipulating the hand lever 98 clockwise as viewed in Fig. 15, the clamps 94 approach the projector on the welding arbor and force the projector into engagement with said arbor, whereby the side edges 26 of the projector spring into overlapping engagement with each other. While the operator holds the projector clamped to the welding arbor with the overlapping projector edges in alignment with the roller electrode 104, he moves handle 110 in the direction of arrow 120 in Fig. 16, whereby the spring 114 causes the roller electrode 104 to follow the contour of the overlapping projector edges and weld the same together by passing current therethru. In order to prevent contact between the roller electrode and the welding arbor while the operator interchanges projectors on the welding arbor, the roller electrode is held out of engagement with the welding arbor by a suitable cam 130 which rocks the electrode carrying arm 106 clockwise as viewed in Fig. 16 upon a return of the handle 110 into the position of Fig. 15 after a concluded welding operation.

While the embodiment of the present invention as herein disclosed, constitutes a preferred form, it is to be understood that other forms might be adopted, all coming within the scope of the claims which follow.

What is claimed is as follows:

1. In a method of making a flared, hollow frustum, the steps of forming a sheet metal blank with side edges of concave profile, forming the blank into frusto-conical shape, and spinning the frusto-conical blank to form it into the flared-frustum shape and simultaneously to draw the side edges of the blank into adjacent, parallel relation.

2. In a method of making a flared, hollow frustum, the steps of forming a sheet metal blank with side edges of concave profile, forming the blank into frusto-conical shape, spinning the frusto-conical blank to form it into the flared-frustum shape and simultaneously to draw the side edges of the blank into adjacent, parallel relation; and welding the adjacent side edges of the flared frustum while it is clamped to a sizing arbor.

ERNEST R. FAUSSET.